Oct. 4, 1927.
G. C. THOMAS, JR
1,644,312
CABLE CONNECTER
Filed Feb. 25, 1927
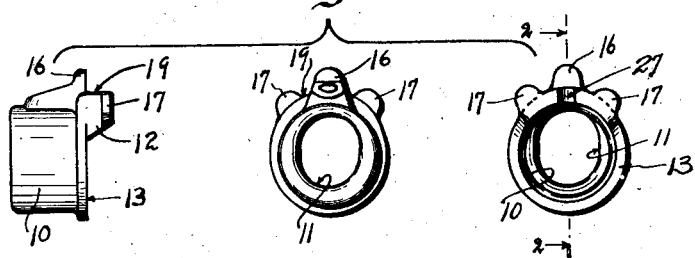
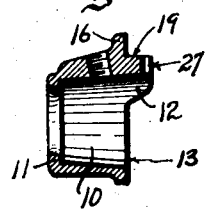
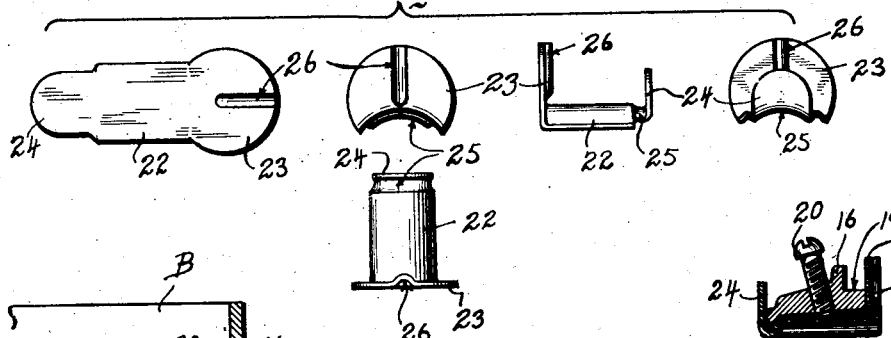
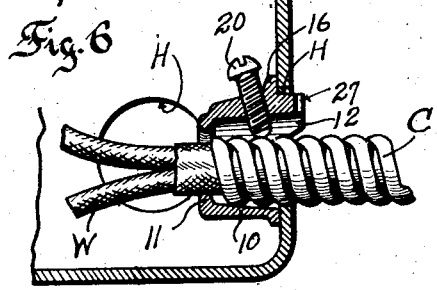
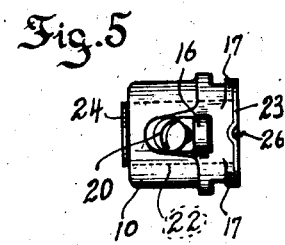
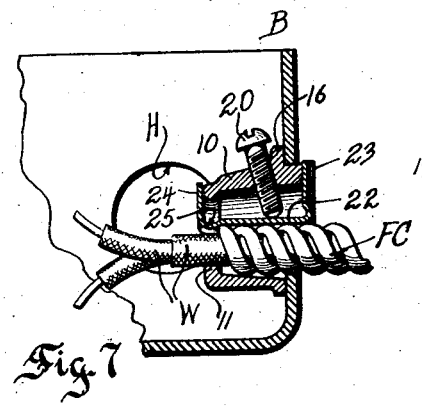
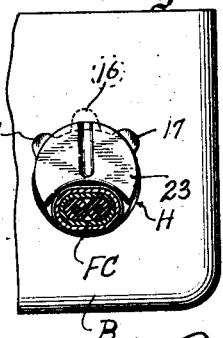
INVENTOR
George C. Thomas, Jr.
BY
Bohleber & Ledbetter
ATTORNEYS Patented Oct. 4, 1927.

1,644,312

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed February 25, 1927. Serial No. 170,982.

This invention relates to improved cable connecters to fasten cable to electric fixture and outlet boxes.

An object of the invention is to produce an improved cable connecter wherein a single operating means, such as a screw, functions to anchor the connecter in the box hole and also secure a cable therein; and more particularly it is a purpose to dispose the operating means inside the box.

A further object of the invention and an important feature thereof is to produce a cable connecter in the form of a sleeve including an extension which projects from the sleeve through the box hole, the sleeve including means and being so formed as to expose a portion of the box hole edge directly to a cable placed therein, there being provided a single operating means, such as a screw, which is threaded through the sleeve wall and is mounted within the box to grip the cable against the exposed box hole edge and anchor the connecter in the box hole, the parts being so constructed and arranged that the action or pressure of the screw operating means does not tend to dislodge or move the cable off or away from the exposed box hole edge against which it is gripped by the cable clamp operating means.

It is also an object to produce a connecter provided with an adapter element by which the connecter is adapted to universally take various sizes of cable, large or small cable. The adapter includes a cable clamp plate with a unitary shutter, both of which are actuated by the operating means to clamp a cable of any size within range of the connecter and box hole and close the shutter across the sleeve or box hole adjacent the cable received thereinto; the connecter member which carries the adapter being distinguished by making it in sleeve form with a cut-away end to expose the box hole edge.

With the above and other objects in view, the invention has relation to an example of construction and an embodiment of the invention as shown in the accompanying drawings.

Figure 1 is a cluster view showing a side elevation, inner end, and outer end, respectively, of a connecter member adapted to mount the screw operating means inside a box; the connecter member being of sleeve form cut away at one end when used with an adapter element; and Figure 2 is a longitudinal section of the connecter shown in Figure 1.

Figure 3 is a cluster view of the adapter showing its progressive stages of manufacture from the flat sheet metal blank to the finished adapter member which includes a clamp plate, a sleeve or box hole shutter, and means to retain the adapter movably in the sleeve against rotation. This adapter is used with the Figure 1 cut-away end sleeve connecter to convert or adapt the sleeve to small size cable.

Figure 4 is a longitudinal sectional view of the complete connecter; and Figure 5 is a plan view thereof. The adapter is assembled with the connecter.

Figure 6 shows the connecter in its simplest form without the adapter, the screw being inside the box and pointed towards the exposed box hole edge portion. This is a box assembly view with the connecter anchored in the box hole gripping a cable against the exposed box hole edge.

Figure 7 is also a box assembly view of the connecter employing the adapter, the connecter being anchored in a box and securing a cable therein; and Figure 8 is an outside end elevation of Figure 7.

Electric fixture or outlet boxes B are ordinarily provided with knock-out openings or holes H to receive the cable C and a cable connecter to fasten the cable in the box and to pass the wires W into the box in the usual way and make electric connection in the box with other circuit wires inside the box.

Referring further to the drawings for a description of examples of the invention, there is shown a connecter member which may be made in the form of a sleeve 10 bushed at one end as at 11. The bushed end 11 of the sleeve constitutes its inner end against which the end of the cable C rests and through which the wires W are passed inside the box B. An extension 12 is made on the outer sleeve end and overhangs the transverse sleeve end abutment edge 13. The end edge 13 of the sleeve is adapted to rest or abut against the inside of the box wall proximate and eccentric to the box hole edge H. The sleeve extension 12 characteristically makes the connecter member 10 slightly longer at one side than the other. In other words, the sleeve is cut away at one end to form the transverse abutment edge 13 and overhanging extension 12 which provides means to expose a portion of the box hole edge to a cable and to conceal the other portion of the box hole edge. Thus the sleeve extension 12 projects through the box hole and conceals one part of the box hole edge, but the abutment end 13 exposes the remaining part of the box hole edge directly to a cable C received therein.

The sleeve carries with it anchorage means in the nature of box hole edge abutments spaced apart to fix the connecter against longitudinal displacement once it is mounted in position and the operating means or screw is tightened up. The example of anchorage means employed comprises an inside box abutment ear or ears 16, the abutting face of which is in peripheral alignment with the sleeve end edge 13. In other words the sleeve end edge 13 and ear 16 face and engage against the inside of the box wall. The sleeve extension 12 carries an abutment ear or ears 17 which are spaced from the ear 16 and sleeve edge 13 a distance about equal to the thickness of the box wall B so as to receive the box hole edge down in between the ears 16 and 17. In this way the abutment ears 16 and 17 prevent displacement of the connecter from the box hole by overlapping the box wall at the concealed part of the box hole edge. The sleeve extension 12 also provides a raised box hole edge bearing face 19 which is defined between the spaced ears 16 and 17 and this bearing face 19 is adapted to seat or bear against the box hole edge H and thereby conceal a part of the hole edge when the connecter is in the box.

The bearing face 19 is positively seated against the edge of the box hole by reaction of the screw operating means when the parts including a box and cable are assembled as will be described, and that reaction also positively seats the spaced abutment ears 16 and 17 in overlapping relation against the inside and outside surfaces of the box wall. The bearing face 19 is so arranged or raised that the sleeve 10 is disposed eccentric to the box hole H, that is to say the exposed portion of the box hole H extends or circles in an eccentric manner into the sleeve 10 proximate its edge 13. Since the exposed portion of the box hole edge extends eccentrically into the sleeve, it follows that the cable C rests directly against the box hole edge and is there gripped, pinched and securely clamped by the connecter operating clamp means.

The sleeve 10 is placed inside the box and its extension 12 projects through the box hole to establish anchorage with the box wall by the abutment ear means already described. The connecter is therefore shaped and formed with its cut-away end 12—13 so that the sleeve portion 12 may be too large to go through the box hole but the extension 12 and ears 17 will pass through and execute a hooking action around the box hole edge. Thus the connecter member 12 is suitable in size to fit into or through the box hole and leave exposed a part of the box hole edge.

Suitable operating means for this cable connecter comprises for example, a screw 20 which is preferably threaded through the wall of the sleeve on the inside of the box and the screw-shank may be pointed directly towards the mean center of the abutment end edge 13 of the sleeve. This position of the screw 20 causes it to point directly towards the exposed part of the box hole edge when the connecter is mounted in position in the box.

The screw 20 is placed proximate or close to the sleeve extension and is tilted slightly so that the screw end is close to or nearly in the plane of the box wall so as to grip the cable straight toward and against the exposed box hole edge portion. This arrangement prevents the pressure of the screw from pushing the cable C back out through the box hole, and this is an important feature along with the fact that these improvements enable me to place the screw inside the box in this type of connecter which is an advantage because the connecter can be used for both old and new house wiring work. Figure 6 illustrates the application of the connecter just described and shows how the reaction of the screw 20 against the cable C positively forces the bearing face 19 against the concealed box hole edge and holds the anchorage ears or abutments in place to anchor the connecter against longitudinal displacement.

In some forms of the invention, it is desirable to employ what I may call an adapter by which the cable connecter is adapted to different size cable and particularly by which small cable may be anchored to the box and secured in standard size box holes without at the same time leaving an opening into the box adjacent the cable. The adapter is useful with a connecter of this type having its screw inside the box because the adapter includes a clamp plate interposed between the screw and cable which prevents the screw from dislocating the cable from its seated anchorage against the exposed box hole edge.

In describing the adapting cable connecter as an improved form of the invention, reference is made to Figures 3, 4, 5, 7 and 8. The adapter comprises a cable bearing clamp plate 22 carrying a sleeve and box hole closing shutter plate 22 at one end and another shutter plate or guide and retainer member 24 at the other end. The adapter is substantially U-shaped and is mounted in the sleeve 10 for free lateral motion therein. The shutter or retainer end 24 is provided with a groove 25 to fit the contour of the bushing end 11 of the sleeve which permits the clamp plate 22 to move outwardly away from the center of the sleeve 10 to its maximum position as in Figure 4 to admit a large cable. In one of the shutter plates 23 or 24 there is pressed a rib 26 which slides in a radial groove 27 made in the connecter member 10 or sleeve extension 12. The cooperating guide rib and groove means 26—27 permits free lateral motion of the adapter 22—23 within the sleeve but prevents relative rotation between the sleeve 10 and adapter. The guide means 26—27 therefore retains the clamp plate 22 in line with the end of the screw 20 and the two end plates 23 and 24 also prevent the adapter from longitudinal displacement from the sleeve.

The clamp plate 22 may be made wide enough to rest against the inner sleeve wall when the adapter is adjusted full distance across the sleeve to reduce the cable passage in the sleeve to small size flat or oval cable FC. In other words the width of the clamp plate 22 determines the lateral travel of the adapter in the sleeve and consequently the travel of the shutter plate or plates to close the sleeve or box hole.

The closing shutter plate 23 is preferably a close fit to the box hole but is fractionally smaller so it may be introduced through the box hole from the inside of the box. To place the connecter in the box hole, the shutter 23 is dropped to its innermost or closed position and thereafter it is opened up to receive a cable. The clamp plate 22 is arched or curved in cross section to conform to the general shape of cable received into the sleeve. It follows therefore that the curved clamp plate 22 and opposite internal wall of the sleeve cooperate to provide a variable size cable passage through the sleeve, the passage being substantially round and similar to or like a cable.

The means for obtaining the variable and adjustable size cable passage through the sleeve connecter described in the foregoing paragraph also affords the same characteristics for the bushing at the inner end 11 of the sleeve connecter, because I provide in effect a variable size bushing 11—25 as will be explained. While the bushing 11 protects the wires W from being worn or cut by the jagged or sharp cable end when the large size or round cable C is used, it does not protect the wire insulation coming from small size cable FC since the use of the latter leaves exposed about half of the ragged armored edge since the bushing 11 is in reality much too large to effectively accommodate itself to and cover over the full periphery of ragged end or edge of a small armored cable. My invention however provides against this difficulty in its capacity to adapt its bushing 11—25 to suit various size cable as effectively as it varies the size of its cable passage.

The improved variable or adjustable size bushing includes the movable external rib 70 in the clamp plate 22 as defined by the groove 25 together with the stationary rib forming the bushing 11. In other words the groove 25, which enables the clamp plate to lie proximate the sleeve wall, also presents its external rib shape in radial alignment with the bushing 11 and the two members 11 and 25 become a variable size bushing 11—25 to positively abut and close against the inner ragged cable edge, as shown in Figure 7, to protect the wire insulation entirely around its surface no matter which way or direction the wires W are pulled or bent in the box B. The adjustment of the clamp plate and shutter to suit a given cable simultaneously adjusts the bushing 11—25 to suit the same cable, and this is an important feature of my invention.

The small size upturned shutter or guide plate 24 may preferably be reduced in width as compared to the clamp plate 22 so that the upturned end 24 may pass through the bushed inner end 11 of the sleeve and include the groove 25 which registers with and conforms to the bushing. However, I may prefer to make the clamp plate 22 and guide or retainer end 24 in various forms or widths since it is primarily the shutter end 23 which closes the sleeve and box hole.

Figures 7 and 8 show the application of the adapter connecter of the exposed box hole edge type to a box B and it is seen how a small size cable, for example flat or oval-shaped cable FC is anchored in the box hole against the exposed hole edge by the clamp plate 22 forced against the cable by the screw 20. At the same time the screw 20 actuates and closes the shutter 23 over that portion of the open sleeve or box hole which is not closed by the small size cable. The shutter 23 is not in the way for large size cable, but satisfactorily closes off that sleeve opening and box hole portion which is not occupied by the cable and connecter and thus the box is sealed against entry of dirt, plaster or other foreign matter prevalent in building operations.

It is therefore seen that I have produced, in either form of the invention, a cable connecter comprising a connecter member say of sleeve form 10 and which is suitable in size to fit into the box hole and which is so formed as to leave exposed a portion of the box hole edge. The cable is adapted to rest and be gripped directly against that exposed box hole edge portion. The other portion of the box hole edge is concealed by the connecter extension 12 which projects through the box hole and characteristically hooks around the outside edge of the hole by the outer ears 17 to anchor the connecter in the box. The single operating screw 20 is threaded through the connecter sleeve inside the box toward the cable and is disposed substantially opposite the exposed box hole edge portion and the screw-shank is pointed toward the cable to grip it between the screw end and the exposed box edge. The reaction of this screw and/or cable clamp means 20 therefore performs several functions, namely, that of rendering effective the box hole anchorage means to fix the connecter member in the box hole, that of gripping the cable against the exposed box hole edge, and that of closing the shutter, and that of reducing the bushing 11—25 to the size of the cable at hand.

In a cable connecter of this exposed box hole edge type, no extra screw attachments or screw connections are required to be made into or through a box. In other words, only one screw is used to secure a cable in the box hole against the box edge and to anchor the connecter in the box hole, and that single screw is carried on the connecter which is an important feature and makes for convenience in the use of the connecter and enables it to be used with standard boxes.

What I claim is:

A connecter comprising a sleeve suitable in size to fit into a box hole and including means and being so formed as to directly expose a portion of the box hole edge to a cable therein received, spaced abutments included on the connecter between which a box hole edge is received to anchor the connecter in the box, a stationary bushing carried with the sleeve at its inner end; a cable clamp plate and means to guide it laterally within the sleeve, a movable bushing rib and groove formed in the clamp plate at one end thereof in radial alignment with and to cooperate with the first bushing named and to permit the clamp plate to lie proximate the sleeve wall, a shutter carried at the other end of the clamp plate to close the sleeve; and operating means carried with the sleeve to move the clamp plate against a cable and grip it against an exposed box hole edge, to close the shutter, to render effective the abutments, and to secure the movable bushing rib and groove down over and against the end of a cable armor.

In testimony whereof I affix my signature.

GEORGE C. THOMAS, Jr.